United States Patent
Wechsler

(10) Patent No.: US 11,375,688 B1
(45) Date of Patent: Jul. 5, 2022

(54) ANIMAL WATER DISPENSER

(71) Applicant: Lawrence I. Wechsler, Great Neck, NY (US)

(72) Inventor: Lawrence I. Wechsler, Great Neck, NY (US)

( * ) Notice: Subject to any disclaimer, the term of this patent is extended or adjusted under 35 U.S.C. 154(b) by 397 days.

(21) Appl. No.: 14/492,083

(22) Filed: Sep. 22, 2014

Related U.S. Application Data

(60) Provisional application No. 61/880,183, filed on Sep. 20, 2013.

(51) Int. Cl.
| | | |
|---|---|---|
| *A01K 5/01* | (2006.01) | |
| *A01K 5/02* | (2006.01) | |
| *A01K 7/02* | (2006.01) | |

(52) U.S. Cl.
CPC .......... *A01K 5/0107* (2013.01); *A01K 5/0114* (2013.01); *A01K 5/0225* (2013.01); *A01K 7/02* (2013.01)

(58) Field of Classification Search
CPC .. A01K 5/0107; A01K 5/0114; A01K 5/0225; A01K 7/02
See application file for complete search history.

(56) References Cited

U.S. PATENT DOCUMENTS

| | | | | |
|---|---|---|---|---|
| 1,373,156 | A * | 3/1921 | Tebbetts | A45F 3/46 206/217 |
| 5,056,424 | A * | 10/1991 | Lai | A45C 11/20 126/373.1 |
| D356,469 | S * | 3/1995 | Musilli | D3/202 |
| 5,636,592 | A * | 6/1997 | Wechsler | A01K 7/02 119/52.1 |
| 5,823,136 | A * | 10/1998 | Zarski | A01K 7/00 119/51.5 |
| 7,287,487 | B2 * | 10/2007 | Hurwitz | A01K 7/00 119/74 |
| 7,578,261 | B2 * | 8/2009 | Fick | A01K 5/0114 119/51.01 |
| 2006/0201055 | A1 * | 9/2006 | Rowe | A01K 5/0114 43/131 |
| 2007/0079762 | A1 * | 4/2007 | Stephanos | A01K 7/00 119/74 |

* cited by examiner

*Primary Examiner* — Christopher R Harmon

(57) ABSTRACT

A dispenser for animals, adapted to dispensing water, potable liquids, granulated solids and other flowable consumables for consumption thereof, allows stable transport when belt mounted on a person of a user. Optionally, the dispenser can include one or more supplemental storage/dispensing portions mountably receivable to, or integral with, a tray portion of the dispenser.

23 Claims, 5 Drawing Sheets

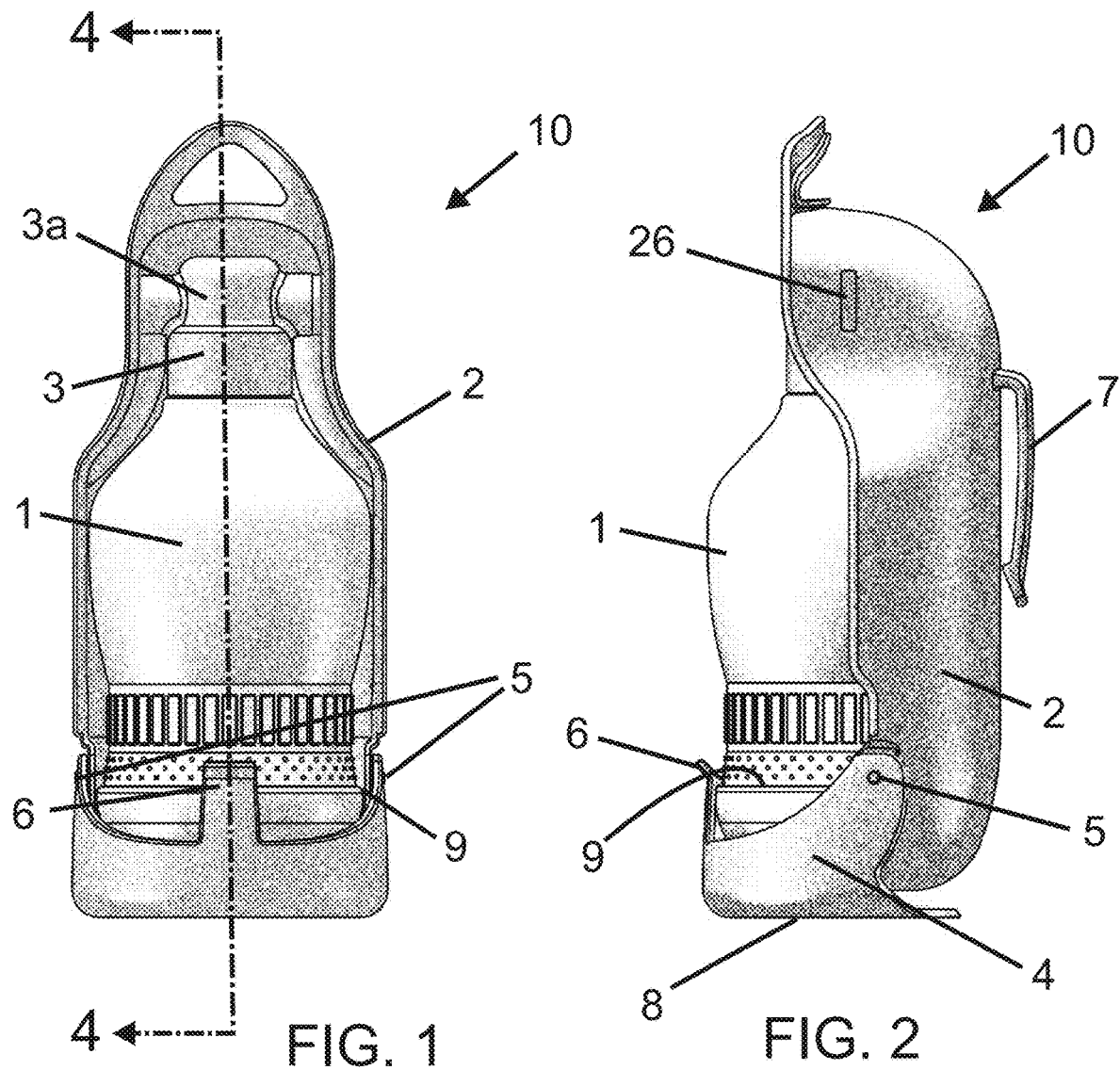

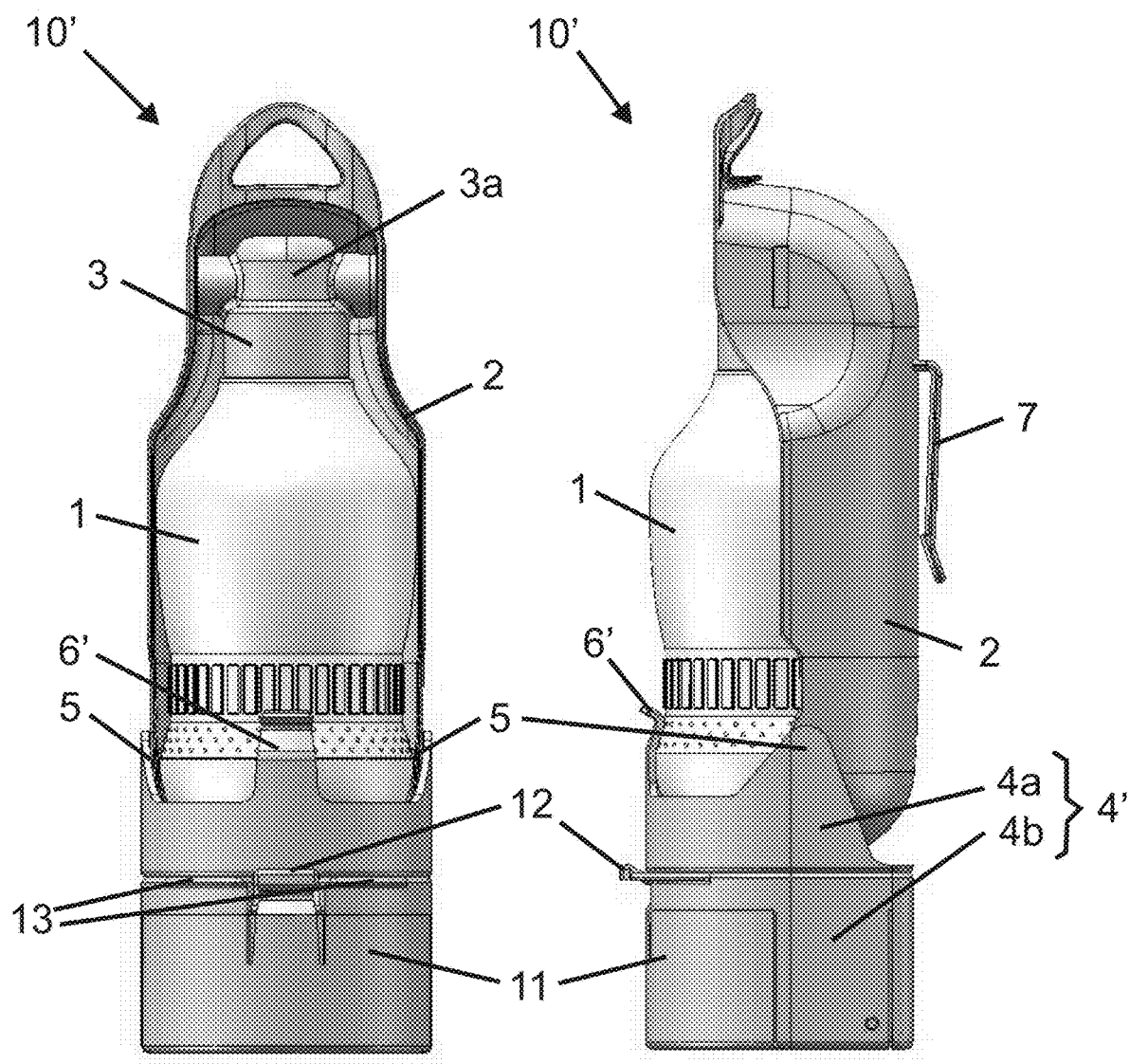

ANIMAL WATER DISPENSER

BACKGROUND OF THE INVENTION

The present invention relates to a portable dispenser for providing an animal with a feed material, including, for example, water or flowable solids, and more particularly, to a water dispenser which can be stably belt mounted for transport, and which can optionally include an attached or attachable accessory operationally suited to storing and/or dispensing, for example, such items as pet treats, pet waste cleanup bags, hand sanitizer, etc., in a convenient manner Such type of a device was previously disclosed in U.S. Pat. No. 5,636,592 issued to Wechsler on Jun. 10, 1997, and which includes an open trough (tray) having a shape allowing at least partial nesting of a suitably configured and sized reservoir therein, the entirety of which is incorporated herein by reference. The reservoir is movable between a first position and a second position relative to the trough, such that when in the first position, the reservoir and trough are nested, and when moved to the second mounted position, the reservoir is brought out of nesting position and is clear of the trough for animal access to contents in the trough selectively transferred thereto from the reservoir, advantageously through an optional valved cap which controls flow of contents from an opening in the reservoir.

In accordance with a preferred embodiment of the Wechsler device disclosed in the aforementioned patent, the bottle and trough are mounted to one another via a hingeable (pivotable) connection proximate a neck region of the bottle. In practice, when a belt clip is provided on a back of the trough such that the dispenser is suited to being hooked over a belt of a user with the bottle in a generally upward position (opening in the bottle facing upwards) for facilitated transport, the bottle tends to repeatedly swing/bounce out of the nested position when the users walks or otherwise moves, due to the weight of the water inside the bottle, making the provision of such a belt clip somewhat impractical.

A further drawback resides in the fact that the since the trough extends as a curved form around the bottom of the bottle when the bottle is nested therein (the latter being provided, for example, as a blow-molded bottle), the dispenser cannot stably stand upright on a resting surface, like a table, etc. While the trough could conceivably be designed with a flat bottom that extends from the back of the bottle to the front so as to enable the unit to stand when in the nested travel position, such localized added height of the trough wall would potentially impede accessibility by a dog or other animal having a snout to the water transferred to the pooling space in the trough.

While being functionally adequate for providing hydration to a pet on an as needed basis, particularly in a travel setting or while away from home, a user of a pet water dispenser of the general type referred to above, which broadly includes a tray (trough) for holding water dispensed from a bottle (reservoir), would require a separately carried supply of other dispensable products used generally in connection with animal husbandry (pet care). For example, treats for providing a reward to a pet, such as for training purposes or for bonding with the pet, would generally be carried in a pocket or training bag. Treats might, therefore, not be readily accessible, particularly while a hand of the user is holding a leash in one hand, since dispensing treats from a separate package of treats would require use of two hands, i.e., one hand to hold the package of treats and the other hand to grab a treat and feed it to the pet.

The same drawbacks would similarly apply by analogy to the dispensing of dog waste pickup bags, hand sanitizer, etc.

It would therefore be desirable to provide a pet water dispenser which is structurally adapted to facilitate transport thereof for use at a remote location by assuring a stable and reliably maintained nesting when not in use, particularly when belt mounted, and allowing the device to be set down in an upright standing orientation on a support surface, while concomitantly permitting optional reception or integration of a supplemental storage and dispensing device to synergistically augment the water dispensing function, thereby to allow, for example, a pet to receive both hydrating liquids and solid food or treats, from the same device.

SUMMARY OF THE INVENTION

Accordingly, it is an object of the invention to provide a dispenser for animals, adapted to dispensing water, potable liquids, granulated solids and other flowable consumables for consumption thereof, which overcomes the drawbacks of the prior art, and optionally having one or more supplemental storage/dispensing portion(s) mountably receivable to, or integral with, a tray portion of the dispenser.

It is a further object of the invention to provide the dispenser in a form which is compact, easy to operate and which may be produced economically.

Briefly stated, a dispenser includes a reservoir for containing water or other flowable/potable substance(s) (synonymously referred to collectively by the term "feed" or "feed material") and a tray (synonymously referred to herein as a "trough") to which water may be transferred from the bottle, for presentation to, and consumption by, an animal, for example, a pet. An opening in the bottle is in fluid communication with a first end region of the tray. A securement and stabilization mechanism is movably mounted to the tray proximate to a second end region of the tray opposite to the first, which is movable between a position in which a structural portion of the mechanism provides a blocking function against removal of the bottle from nested reception in the tray and another position which relieves the securement of the nested condition and reorients the mechanism to a position in which access by the animal to the pooled contents transferred to the tray for consumption in sufficiently unencumbered thereby.

A supplemental storage unit/dispenser is optionally provided as an extension of a second end region of the tray distant from the first end region, such that when the tray is oriented with the first end region facing upward, the storage unit/dispenser is located in a position below an end of the tray bounding the second end region. The storage unit/dispenser can either comprise contiguous structure formed integrally with the securement and stabilization mechanism movably mounted to the region proximate to the second end region of the tray, or comprise a separate structural portion mountable thereto. The precise form of the storage unit/dispenser is not critical to practice of the invention, and can simply be provided in the form of a storage container or bin with an accessible interior. For example, when used to store treats, such storage container would allow the hand of a user to reach in and pick up one or more treats stored therewithin.

The above, and other objects, features and advantages of the present invention will become apparent from the following description read in conjunction with the accompanying drawings.

BRIEF DESCRIPTION OF THE DRAWINGS

FIG. 1 is a front elevational view of a dispenser in accordance with an embodiment of the invention shown in a closed, travel/storage orientation with the bottle nested in the tray and the securement and stabilization mechanism in a locked position;

FIG. 2 is side elevational view of the dispenser of FIG. 1 in the same positional state;

FIG. 5 is a front elevational view of a dispenser in accordance with another embodiment shown in a closed position, with the bottle nested in the tray, and the treat dispenser portion oriented in an inactive position;

FIG. 6 is side elevational view of the dispenser embodiment of FIG. 5 in the same positional state;

DETAILED DESCRIPTION OF THE PREFERRED EMBODIMENT

Referring now to the figures, a dispenser in accordance with an embodiment of the invention is shown generally at 10. Dispenser 10 includes a bottle 1 and a tray 2 which are advantageously configured, as shown, to permit bottle 1 to nest in a concavity (inside of the trough shape) of tray 2. A closure 3 for the bottle 1 is optionally provided (which may be valved, or not). In the depicted embodiment, closure 3 optionally includes a valve portion 3*a*.

Figure 3:
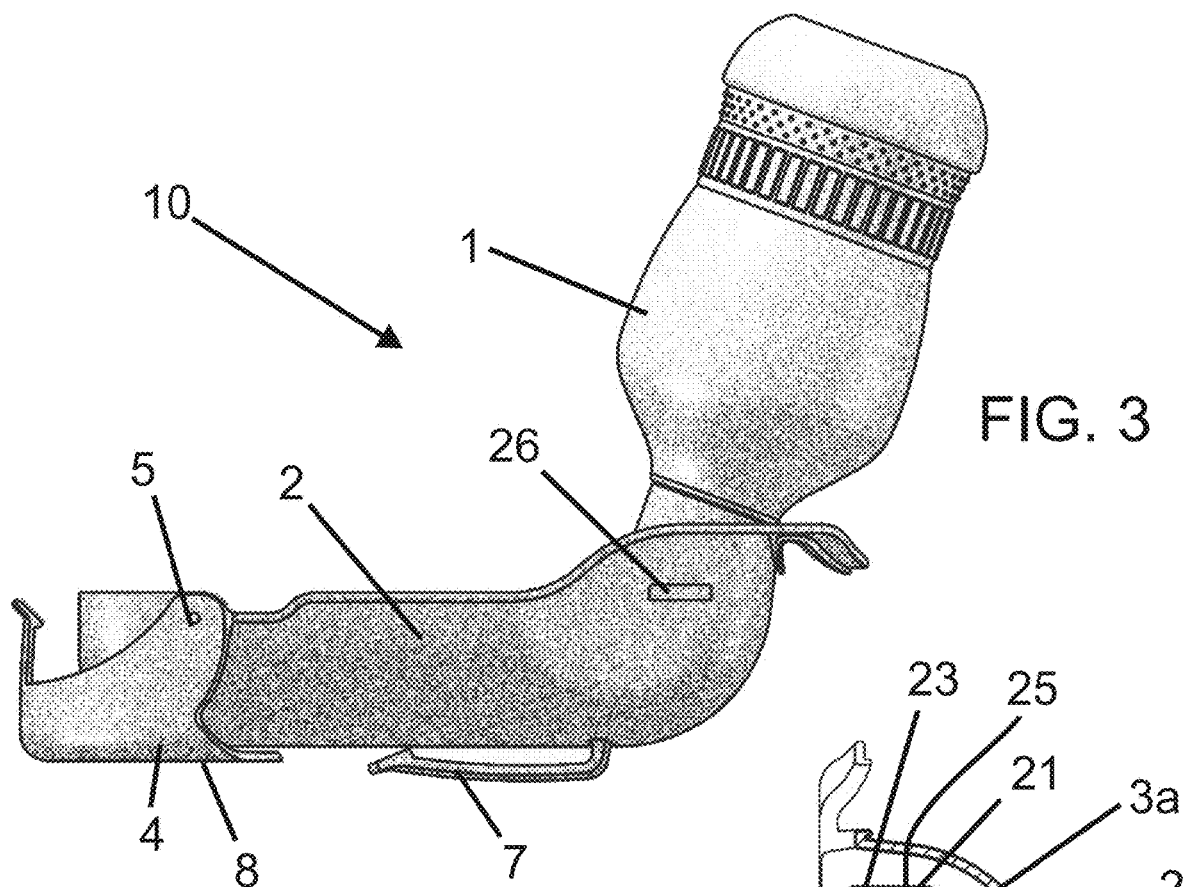
FIG. 3 is a side elevational view of the embodiment of FIGS. 1 and 2, showing the dispenser in an active water dispensing position with the bottle nested in the tray and the securement and stabilization mechanism in an unlocked position swung fee of the pooling space in the tray.
Figure 4:
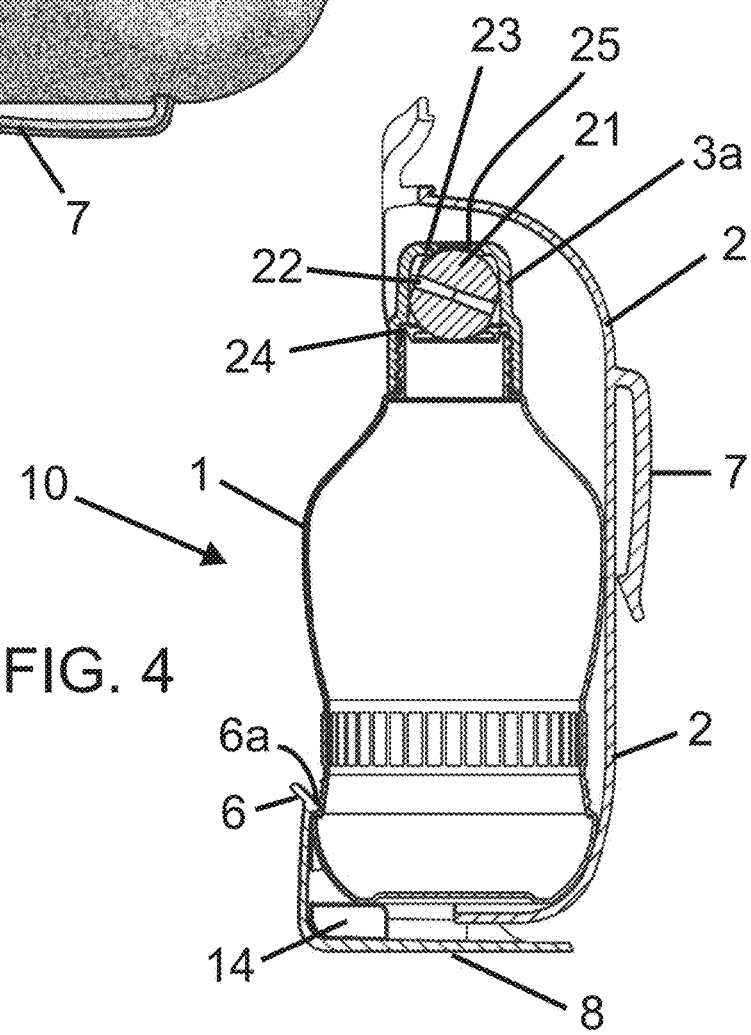
FIG. 4 is a cross-sectional view taken along lines 4-4 in FIG. 1.

For purposes of example, the optional valve portion 3*a* depicted is a ball valve type with an internal ball mechanism, as depicted in FIG. 4. Valve portion 3*a* includes a rotatable ball 21 held rotatably within the housing cavity of valve portion 3*a* by a retainer ring 24 and which is non-rotatably coupled to tray 2 (conveniently by a non-cylindrical (flattened) shaft 26 laterally extended from the ball 21 which is received in a correspondingly shaped slot in a side of the tray 2) such that pivoting of the tray 2 out of the nested orientation rotates the ball 21 inside valve portion 3*a* causing an internal passage 22 to align with an opening 25 in valve portion 3*a* and the opening of the bottle 1, to allow flow of contents into the tray 2 when the tray 2 is moved to the active feeding position shown in FIG. 3. In the closed, travel position depicted in FIG. 4, the internal passage 22 no longer provides communication between the bottle 1 and the opening 24, and the ball 21 is advantageously internally sealed to valve portion 3*a* by an o-ring seal 23. This type of valve mechanism is currently employed in the GULPY® pet water dispenser marketed by New Angle Pet Products, Inc. Other valves, either manually operated, or automatically actuated in response to a hinging motion, are also contemplated and optionally provided.

In accordance with a feature of the invention, a base attachment 4 is pivotably mountable to tray 2 so as to be mountably movable, for example, about a pair of pivots 5, from a first position shown in FIGS. 1, 2 and 4 to a second position shown in FIG. 3.

Base attachment 4 includes a locking tab 6 (or any other suitable structure providing a blocking function) which is engageable with bottle 1 when pivoted into a locking position, so as to maintain the nested positioning of FIGS. 1 and 2 when dispenser 10 in not in active use (travel oriented state). When in the travel/storage oriented state shown in FIGS. 1 and 2, locking tab 6 blocks movement of bottle 1 out of its nested state in tray 2, thereby preventing undesirable bouncing of the bottle 1 out of the tray 2 when filled with water, and particularly when carried/transported on the person of a user by use of an optionally provided belt clip 7 on the back of tray 2.

As shown in FIG. 4, a stop 14 is advantageously provided on base attachment 4 which operates to prevent base attachment from further upward pivotal movement once sufficient engagement is achieved between locking tab 6 and bottle 1 to maintain a locked state.

Additionally, base attachment 4 advantageously includes a bottom facing portion which is suitably configured to allow stable resting engagement with a planar support surface, so as to allow the dispenser to stand upright when placed on a table, etc. For example, the bottom surface 8 of base attachment 4 is either formed as a generally flat surface, as shown, or has protrusions or bottoms of side and/or back walls which are alignable generally with a reference plane.

In order to better ensure securement of base attachment 4 in the locking position, bottle 1 optionally includes a ridge or shoulder 9 which engages cooperative structure 6*a* carried on locking tab 6, providing a snap fit which requires flexing of the locking tab 6 downward to relieve the locked engagement.

As mentioned, the invention optionally allows a supplemental storage unit/dispenser to be provided as an extension of the base attachment 4, such that when the tray 2 is oriented with the first end region facing upward, the storage unit/dispenser is located in a position at or below an end of the tray 2 bounding the second end region. It is noted that the term "unit" refers to a device with a particular specified function, and can include one or more (multiple) moving and discrete parts. Turning now to FIGS. 5-9, an embodiment illustrating one such example, directed to a treat storage and dispensing unit, applies by analogy to any storage module(s) for other material/articles, such as dog waste pickup bags, hand sanitizer, coins, etc.

In accordance with the depicted embodiment, a dispenser is shown generally at 10'. Base attachment 4' includes a top portion 4*a* and a bottom portion 4*b*. It is noted that the top portion 4*a* and the bottom portion 4*b* can be provided as a single integrated base attachment 4', or optionally as separate parts assemblable to one another to collectively define base attachment 4'.

Like the previously described embodiment, top portion 4*a* of base attachment 4' includes a locking tab 6' which is engageable with bottle 1 so as to maintain the positioning of FIGS. 5 and 6 when dispenser 10' in not in active use (travel oriented state). When in the travel oriented state shown in FIGS. 1 and 2, locking tab 6' blocks movement of bottle 1 out of its nested state in tray 2, thereby preventing undesirable bouncing of the bottle 1 out of the tray 2 when filled with water, and particularly when carried by use of optionally provided belt clip 7.

Figure 7:
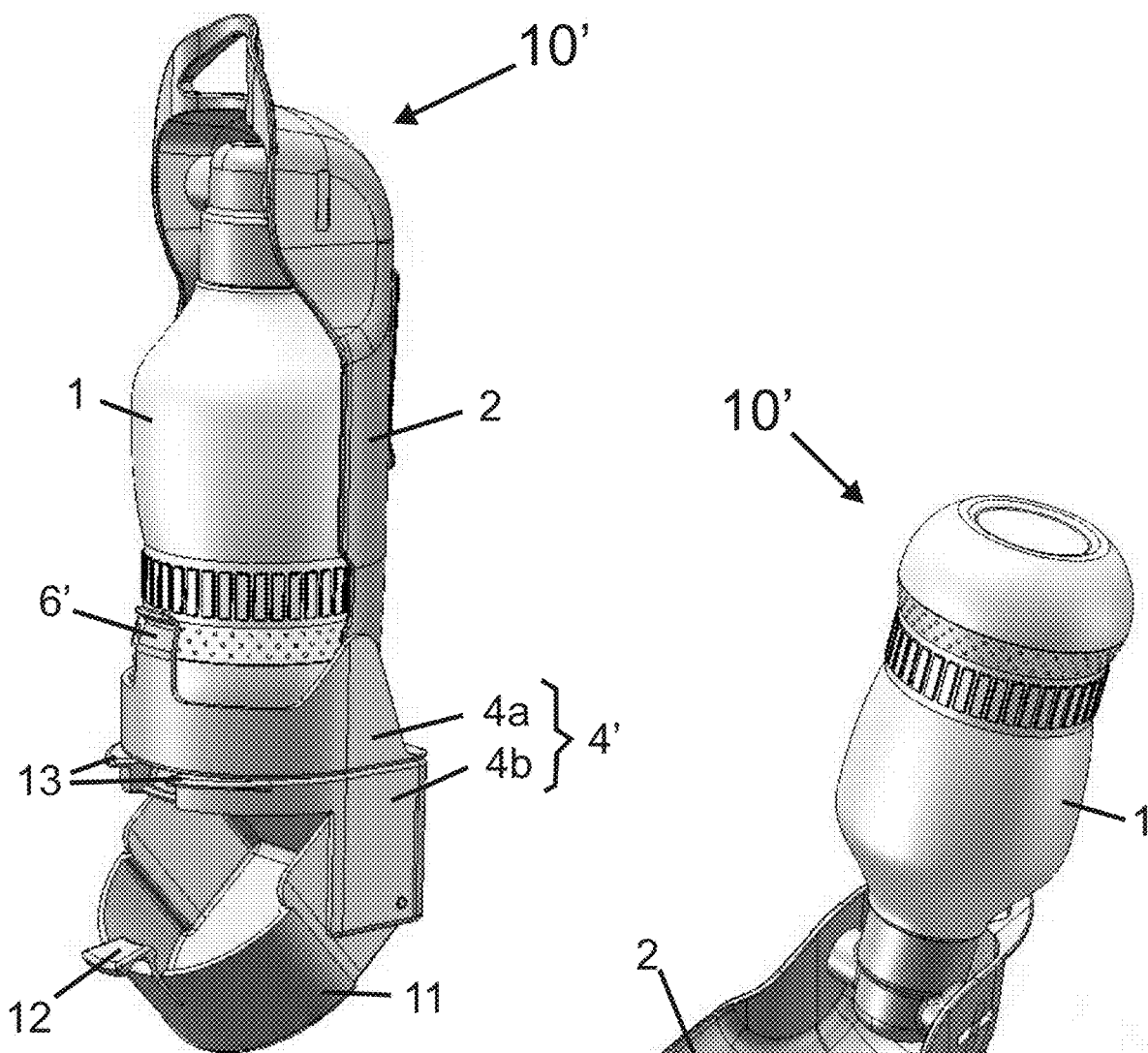
FIG. 7 is a front perspective view of the embodiment of FIGS. 5 and 6, showing the treat dispenser in an active position allowing hand access to treats stored within a pivoting hopper.
Figure 8:
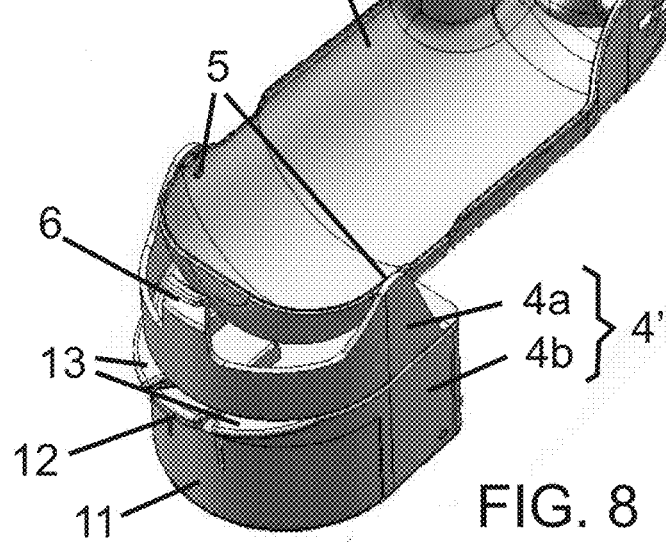
FIG. 8 is a perspective view showing the dispenser of FIGS. 5-7 showing the treat dispenser portion in the inactive position, folded down and away from the tray, with the bottle brought out of its nested condition in the tray, and into an active water feeding position.
Figure 9:
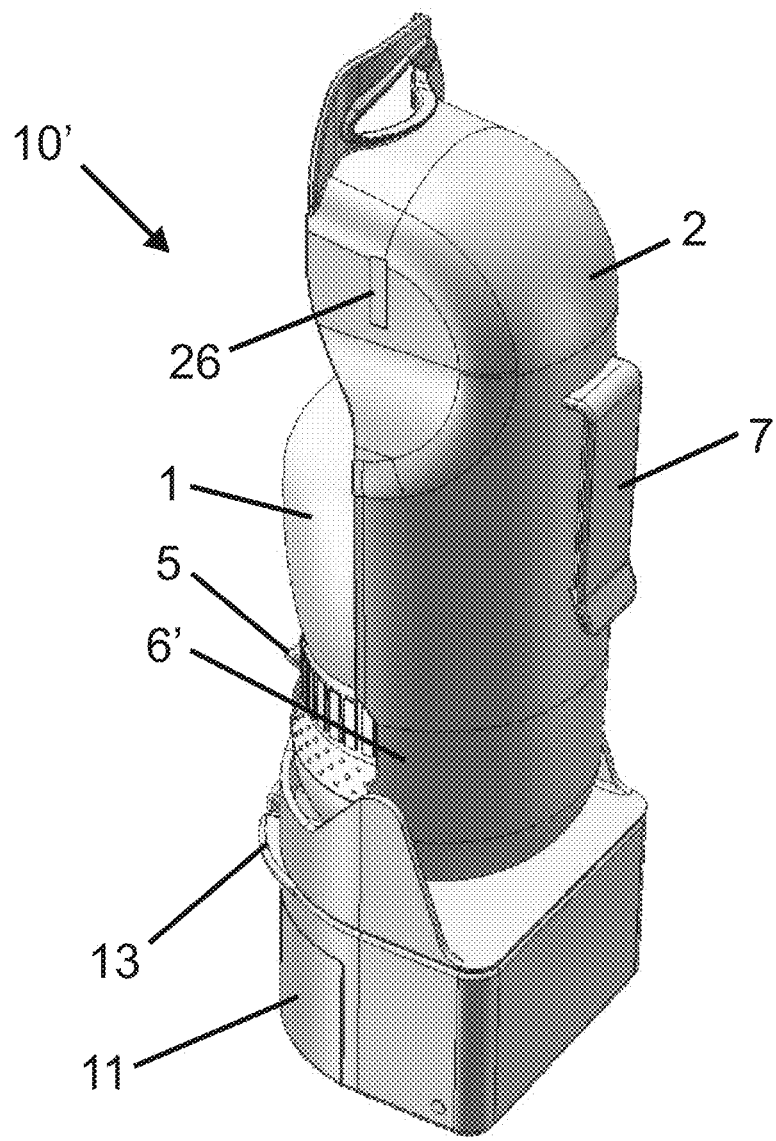
FIG. 9 is a rear perspective view of the dispenser of FIGS. 5-8.

A bin portion 11 for containing treats is pivotably mounted to bottom portion 4*b* such that it is moveable from the closed position shown in FIGS. 5 and 6, to the open position shown in FIG. 7. A snap closure 12 for engaging cooperative structure carried on the bottom portion 4b is advantageously provided, and serves to maintain the bin portion 11 in the closed position until treat dispensing is desired. One or more flanges 13 (two being shown) are optionally provided to advantageously allow the bin portion 11 to be opened without the need to apply downward force on the snap closure 12 alone, and permits facilitated operation much in the manner of the well known change purse. Advantageously, the belt clip 7 is configured such that when hooked over a belt, the dispenser 10' will be oriented generally upright with storage and/or access features of bottom portion 4b being accessible and operational for performing the function or functions to which they are suited, thereby allowing one-handed operation while the device 10' remains conveniently and securely mounted to the person of the user. It is noted that any other suitable mechanism or structure for fastening the device 10' to a belt or other clothing feature, for example, a front trouser pocket, advantageously as providing the feature mentioned above, can be substituted for the belt clip 7 shown without departure from the invention.

The various operations of the dispenser 10' will now be described. When a treat dispensing function is desired, bin portion 11 is opened against the snap closure 12 to the position shown in FIG. 7, allowing hand access to the interior thereof in which treats (not shown) are storable. Alternatively, when a water dispensing function is desired, the bin portion 11 remains in the closed position, and base attachment 4 is pivoted against the engagement of the locking tab 6' with bottle 1 to relieve the blocking of bottle 1, and bottle 1 is pivoted out of the nested state in tray 2 to the position shown in FIG. 8. Water may then be dispensed from bottle 1 into tray 2 for consumption by an animal, such as a dog. When the animal is finished drinking, the bottle 1 is returned to the nested state, and base attachment is pivoted back to the position shown in FIGS. 5 and 6.

While the above described embodiment is deemed advantageous, it is by no means to be considered limiting of the invention as broadly contemplated. The combination of a water dispenser and storage unit/dispenser can be embodied in any style portable animal water dispenser having a tray in which water is introduced at a first end, and in which the treat dispenser portion is positioned at a second end distant or spaced apart from the first end. The invention, as pertaining to an embodiment specifically as including a dispenser module or modules provided as a supplemental structure at an end of a water receiving tray, therefore, need not be limited to the type of dispenser having a nested bottle and tray (which, as described with particular regard to the first embodiment of FIGS. 1-4, benefits additionally from the locking feature applicable to such structure).

Furthermore, the precise manner of providing access to treats or other stored contents, such as waste bags, etc., is not crucial to the invention. For example, while a pivotally opening and closing bin portion is described by example, the bin portion could alternatively take the form of a sliding draw or could include a door, etc. The treat dispensing portion could alternatively be a more complex mechanism, for example allowing dispensing of a single treat, one at a time, by depressing a lever which releases a treat from a chute.

As noted above, instead of a treat storage unit being incorporated as a supplemental portion of a water dispenser as described, a mechanism for storing dog waste pickup bags could be provided, either in place of, or in addition to, the treat storage portion. For example, such a module or integral add-on would hold a roll of plastic bags, and dispense them as needed by, for example, conventional means currently employed and well known, i.e., from a spool.

Further more, it is noted that one or more optional storage/dispensing units can be provided in stackable orientation, one atop the other, either as mutually engageable and detachable modules, or as an integral multi-function unit, or alternatively, side by side or front to back, within the contemplated scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A device for providing feed material to an animal for consumption thereby, comprising:
   a tray being configured to provide an accessible interior space suitably configured to hold and present a quantity of contents transferred thereto from a feed material containing reservoir for access by the animal, the tray having a first end region and a second end region, said second end region being spaced apart from the first end region along a device axis, the reservoir being receivable to the tray with at least a portion of the reservoir being accommodated in said interior space of said tray in an at least partially nested condition with an opening in the reservoir being positioned at or proximate to said first end region; and
   a base portion being pivotably mounted to said tray at or proximate said second end region, said base portion being movable by pivoting between a locked position in which blocking structure carried on said base portion inhibits removal of the reservoir from said at least partially nested condition, and an unlocked position in which interference of said blocking structure with the reservoir is relieved and removal of the of the reservoir from said at least partially nested condition is permitted and the base portion is located sufficiently clear of said tray to allow animal access to the quantity of the contents of the feed material, at least a portion of said base portion extending beyond an outer boundary of an end of the tray when in said locked position, said base portion being configured to allow said device to rest stably on a planar surface when in said locked position such that said device is oriented in a generally upright position with said device axis oriented generally vertically and said tray is supported with the first end region being oriented in a top position of the device.

2. A device for providing feed material to an animal for consumption thereby, comprising:
   a tray comprising an open trough structure including an accessible interior space suitably configured to hold and present a quantity of contents transferred thereto from a feed material containing reservoir for access by the animal, the tray having a first end region and a second end region, said second end region being spaced apart from the first end region along a device axis, the reservoir being receivable to the tray with at least a portion of the reservoir being accommodated in said interior space of said tray in an at least partially nested condition with an opening in the reservoir being positioned at or proximate to said first end region; and
   a base portion being movably mounted to said tray at or proximate said second end region, said base portion being movable between a locked position in which blocking structure carried on said base portion inhibits removal of the reservoir from said at least partially nested condition, and an unlocked position in which interference of said blocking structure with the reservoir is relieved and removal of the reservoir from said at least partially nested condition is permitted and the base portion is located sufficiently clear of said tray to allow animal access to the quantity of the contents of the feed material, at least a portion of said base portion extending beyond an outer boundary of an end of the tray when in said locked position, said base portion being pivotably mounted to said tray to permit pivotable movement of said base portion between said locked and unlocked positions.

3. A device according to claim 2, further comprising at least one unit for at least one of storage or dispensing of at least one product, said at least one unit being receivable to, or integral with, said base portion, at least a portion of said at least one unit extending beyond the outer boundary of the end of the tray in a direction of the device axis when said base portion is in said locked position.

4. A device according to claim 3, wherein said tray includes a mechanism for mounting the device to an article of clothing of a user in a manner in which the at least one unit is located in a position in which said at least one unit extends lower than the second end region of the tray.

5. A device according to claim 2 in combination with the reservoir, said reservoir including an outer structural feature which is engageable with cooperative structure carried on said blocking structure.

6. A device according to claim 2, wherein said base portion is configured to rest stably on a planar surface when in said locked position such that said device axis is vertically oriented and said tray is supported with the first end region being oriented in a top position of the device.

7. A device according to claim 2, wherein the reservoir is pivotably mountable at or proximate the opening therein to the tray at or proximate to said first end region so that a portion of the reservoir distant from the opening can be pivotably moved out of the second end region to another position wherein the reservoir is located clear of said interior space so that when a transfer of feed material from said reservoir to the interior space is effected, the animal has feeding access to the feed material.

8. A device according to claim 2, further comprising a mechanism for mounting the device to an article of clothing of a user in a manner in which the at least one unit is located in a position in which said at least one unit extends lower than the second end region of the tray.

9. A device according to claim 3, wherein said at least one unit is configured for holding a supply of edible treats for access by a user.

10. A method of providing feed material to an animal for consumption thereby, comprising:
   providing a device comprising a tray including an accessible interior space suitably configured to hold and present a quantity of the feed material transferred thereto from a feed material containing reservoir for access by the animal, the tray having a first end region and a second end region, said second end region being spaced apart from the first end region along a device axis;
   receiving the reservoir to the tray with at least a portion of the reservoir being accommodated in said interior space of said tray in an at least partially nested condition with an opening in the reservoir being positioned at or proximate to said first end region;
   locating a base portion which is pivotably mounted to said tray at or proximate to said second end region to a locked position in which blocking structure carried on said base portion inhibits removal of the reservoir from said at least partially nested condition, at least a portion of said base portion extending beyond an outer boundary of an end of the tray when in said locked position; and
   relocating said base portion by pivotable movement to an unlocked position in which interference of said blocking structure with the reservoir is relieved thereby permitting removal of the of the reservoir from said at least partially nested condition and the base portion is located sufficiently clear of said tray to allow animal access to the quantity of the contents of the feed material.

11. A method according to claim 10, further comprising:
   providing at least one unit for at least one of storage or dispensing of a product, said at least one unit being receivable to, or integral with, said base portion, at least a portion of said at least one unit extending beyond the outer boundary of the end of the tray when said base portion is in said locked position in a direction of the device axis.

12. A method according to claim 11, further comprising:
   hanging the device from an article of clothing worn by a user in a position in which said at least one unit is accessible by a hand of the user.

13. A method according to claim 10, further comprising:
   configuring said base portion to rest stably on a planar surface when in said locked position such that said device axis is vertically oriented and said tray is supported with the first end region being oriented in a top position of the device.

14. A device for feeding an animal from a feed material containing reservoir, said device comprising:
   a tray comprising an accessible interior space suitably configured to hold and present a quantity of said feed material transferred thereto from the reservoir for access by the animal, the tray having a first end region and a second end region, said second end region being spaced apart from the first end region along a device axis, the reservoir being receivable to the tray; and
   at least one unit for at least one of storage or dispensing of at least one product, said at least one unit being mountably receivable to said tray at or proximate to said second end region, at least a portion of said at least one unit being positionable to extend beyond an outer boundary of an end of the tray at said second end region in a direction of the device axis when said at least one unit is mountably received to the tray, said at least one unit being configured to permit access to said at least one product while said at least one unit remains mountably received to said tray.

15. A device according to claim 14, further comprising a mechanism for mounting the device to an article of clothing of a user in a manner in which the at least one unit is located in a position in which said at least one unit extends lower than the second end region of the tray.

16. A device according to claim 14, wherein said reservoir is pivotably received to said tray with at least a portion of the reservoir being accommodated in said interior space of said tray in an at least partially nested condition with an opening in the reservoir being positioned at or proximate to said first end region.

17. A device according to claim 14, wherein said at least one unit is configured for holding a supply of edible treats for access by a user.

18. A device according to claim 14, wherein the reservoir is pivotably mountable at or proximate an opening therein to the tray at or proximate to said first end region so that a portion of the reservoir distant from the opening can be pivotably moved out of the second end region to another position wherein the reservoir is located clear of said interior space so that when a transfer of feed material from said reservoir to the interior space is effected, an animal has feeding access to the feed material.

19. A feed material dispenser for an animal, comprising:
a tray including an accessible interior space suitably configured to hold and present a quantity of the feed material transferred thereto from a reservoir for access by the animal, the tray having a first end region and a second end region, said second end region being spaced apart from the first end region along a dispenser axis, the reservoir having an opening and being receivable to the tray with at least a portion of the reservoir being accommodated in said interior space of said tray when in a non-use condition, with the opening of the reservoir being positioned at or proximate to said first end region; and
a base portion being pivotably mounted to said tray at or proximate said second end region so as to allow pivotable movement of said base portion between a locked position in which blocking structure carried on said base portion inhibits reorientation of the reservoir from said non-use condition, and an unlocked position in which interference of said blocking structure with the reservoir is relieved and reorientation of the reservoir from said non-use condition is permitted so as to locate the base portion sufficiently clear of said tray to allow animal access to the quantity of the feed material, at least a portion of said base portion being located at an axial position outside of an outer boundary of an end of the tray at said second end region which is farther from said first end region along said dispenser axis than said end of the tray when in said locked position.

20. A feed material dispenser according to claim 19, further comprising at least one unit for at least one of assessable storage or dispensing of at least one product, said at least one unit being receivable to, or integral with, said base portion, said at least one unit including a compartment portion in which said at least one product can be accommodated, at least a portion of said compartment portion extending beyond said axial position in a direction of the dispenser axis when said base portion is in said locked position.

21. A feed material dispenser according to claim 19, wherein the reservoir is pivotably mountable at or proximate an opening therein to the tray at or proximate to said first end region so that a portion of the reservoir distant from the opening can be pivotably moved out of the second end region to another position wherein the reservoir is located clear of said interior space so that when a transfer of feed material from said reservoir to the interior space is effected, the animal has feeding access to the feed material.

22. A feed material dispenser according to claim 20, wherein said at least one unit is operable for implementing said at least one of assessable storage or dispensing when said reservoir and said tray are in said non-use condition and said base portion is in said locked position.

23. A feed material dispenser according to claim 19, wherein:
said accessible interior space has an access opening facing crosswise to said dispenser axis; and
said reservoir is at least partially laterally accommodated in said accessible interior space when in said non-use condition.

* * * * *